US012646750B2

(12) United States Patent
Visbal Mendoza

(10) Patent No.: US 12,646,750 B2
(45) Date of Patent: Jun. 2, 2026

(54) POSITIVE ELECTRODE LAYER, METHOD FOR MANUFACTURING POSITIVE ELECTRODE LAYER, AND ALL SOLID-STATE BATTERY

(71) Applicant: TOYOTA JIDOSHA KABUSHIKI KAISHA, Toyota (JP)

(72) Inventor: Heidy Hodex Visbal Mendoza, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 155 days.

(21) Appl. No.: 18/440,018

(22) Filed: Feb. 13, 2024

(65) Prior Publication Data

US 2025/0030043 A1     Jan. 23, 2025

Related U.S. Application Data

(63) Continuation of application No. 17/994,448, filed on Nov. 28, 2022.

(30) Foreign Application Priority Data

Jan. 20, 2022     (JP) ................................. 2022-007009

(51) Int. Cl.
H01M 10/0562     (2010.01)
H01M 4/02     (2006.01)
(Continued)

(52) U.S. Cl.
CPC ..... *H01M 10/0562* (2013.01); *H01M 4/0407* (2013.01); *H01M 4/485* (2013.01); (Continued)

(58) Field of Classification Search
None
See application file for complete search history.

(56)                References Cited

U.S. PATENT DOCUMENTS

| 2018/0053966 A1 | 2/2018 | Kim et al. | |
| 2021/0135282 A1* | 5/2021 | Furusawa | ........... H01M 10/052 |
| 2021/0159483 A1 | 5/2021 | Kim et al. | |

FOREIGN PATENT DOCUMENTS

| JP | 2010-80168 A | 4/2010 |
| JP | 2013175412 A * | 9/2013 |
| JP | 2021-86834 A | 6/2021 |

OTHER PUBLICATIONS

Machine English translation of Tsuchida (JP2010080168A) (Year: 2010).*

(Continued)

*Primary Examiner* — Ryan S Cannon
*Assistant Examiner* — Karen J. Armstrong
(74) *Attorney, Agent, or Firm* — Oliff PLC

(57)                ABSTRACT

In the present disclosure, a positive electrode layer used in an all-solid-state battery includes a positive electrode active material, a sulfide solid electrolyte, and a coated sulfide solid electrolyte having a coating layer covering a surface of the sulfide solid electrolyte and containing a metal sulfate, and in an S2p spectrum obtained by X-ray photoelectron spectroscopy (XPS) on the coated sulfide solid electrolyte, a ratio (P2/P1) of an intensity P2 of a peak appearing near 163 eV to an intensity P1 of a peak appearing near 167 eV is 0.15 or more and less than 0.36, thereby solving the above problem.

8 Claims, 2 Drawing Sheets

(51) Int. Cl.
    *H01M 4/04*      (2006.01)
    *H01M 4/485*     (2010.01)
    *H01M 10/0525*   (2010.01)

(52) U.S. Cl.
    CPC .. *H01M 10/0525* (2013.01); *H01M 2004/028*
          (2013.01); *H01M 2300/0068* (2013.01)

(56)            References Cited

OTHER PUBLICATIONS

Machine English translation of JP2013175412 (Year: 2013).*
Oct. 3, 2025 Office Action issued in U.S. Appl. No. 17/994,448.
Mar. 13, 2026 Notice of Allowance issued in U.S. Appl. No. 17/994,448.

* cited by examiner

FIG. 1

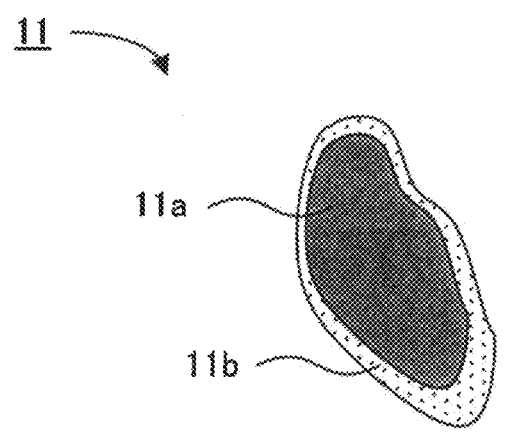

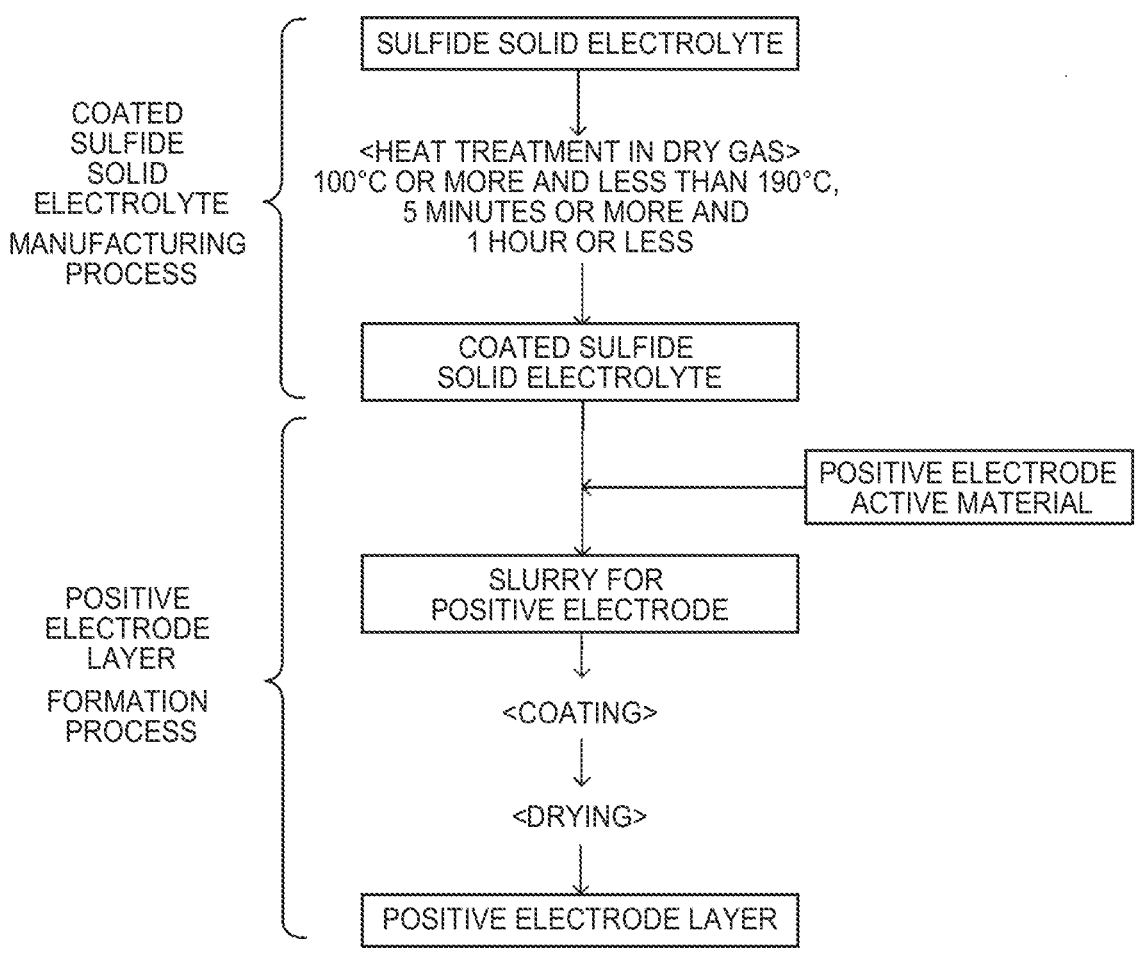

COATED
SULFIDE
SOLID
ELECTROLYTE
MANUFACTURING
PROCESS

SULFIDE SOLID ELECTROLYTE

<HEAT TREATMENT IN DRY GAS>
100°C OR MORE AND LESS THAN 190°C,
5 MINUTES OR MORE AND
1 HOUR OR LESS

COATED SULFIDE
SOLID ELECTROLYTE

POSITIVE ELECTRODE
ACTIVE MATERIAL

POSITIVE
ELECTRODE
LAYER
FORMATION
PROCESS

SLURRY FOR
POSITIVE ELECTRODE

<COATING>

<DRYING>

POSITIVE ELECTRODE LAYER

POSITIVE ELECTRODE LAYER, METHOD FOR MANUFACTURING POSITIVE ELECTRODE LAYER, AND ALL SOLID-STATE BATTERY

CROSS-REFERENCE TO RELATED APPLICATION

This application is a continuation application of U.S. patent application Ser. No. 17/994,448, filed Nov. 28, 2022, which claims priority to Japanese Patent Application No. 2022-007009, filed on Jan. 20, 2022. These prior applications are hereby incorporated herein by reference in their entireties.

BACKGROUND

1. Technical Field

The present disclosure relates to a positive electrode layer, a method for manufacturing a positive electrode layer, and an all-solid-state battery.

2. Description of Related Art

An all-solid-state battery is a battery including a solid electrolyte layer between a positive electrode layer and a negative electrode layer, and has an advantage that a safety device is easily simplified as compared with a liquid-based battery including an electrolyte solution containing a combustible organic solvent.

A technique is known in which a coating layer is provided on a surface of an active material to suppress an increase in the interfacial resistance between the active material and another material. For example, Japanese Unexamined Patent Application Publication No. 2010-080168 (JP 2010-080168 A) discloses an all-solid-state lithium secondary battery including a positive electrode layer containing a Li-containing sulfate-coated oxide-based positive electrode active material in which a Li-containing sulfate is provided on a surface of an oxide-based positive electrode material, and a sulfide-based solid electrolyte material.

Japanese Unexamined Patent Application Publication No. 2021-86834 (JP 2021-86834 A) discloses a positive electrode active material for a lithium secondary battery. The positive electrode active material includes a lithium metal oxide active material and a coating layer positioned on the surface of the active material. The coating layer includes a sulfur compound including one or more selected from the group consisting of $Li_2S$, $Li_2SO_4$, and $Li_2S_nO_x$, where n is $1 \leq n \leq 8$.

SUMMARY

From the viewpoint of high input and output of the all-solid-state battery, there is a demand for a positive electrode layer having a low resistance. The present disclosure has been made in view of the above issue, and a main object thereof is to provide a positive electrode layer having a low resistance.

In order to solve the above issue, the present disclosure provides a positive electrode layer used for an all-solid-state battery, the positive electrode layer including a positive electrode active material and a coated sulfide solid electrolyte that includes a sulfide solid electrolyte and a coating layer that coats a surface of the sulfide solid electrolyte and contains a metal sulfate, and in the positive electrode layer, a ratio of an intensity P2 of a peak appearing near 167 eV to an intensity P1 of a peak appearing near 163 eV (P2/P1) is 0.15 or more and less than 0.36 in an S2p spectrum obtained by X-ray photoelectron spectroscopy (XPS) with respect to the coated sulfide solid electrolyte.

According to the present disclosure, the positive electrode layer includes a predetermined coated sulfide solid electrolyte, whereby the positive electrode layer has a low resistance.

According to the above disclosure, the sulfide solid electrolyte preferably contains Li, P, and S, the peak appearing near 163 eV is preferably derived from a P—S bond, and the peak appearing near 167 eV is preferably derived from an S—O bond. According to the above disclosure, the metal sulfate is preferably a lithium sulfate.

According to the above disclosure, a surface of the positive electrode active material is preferably coated with a Li ion conductive oxide represented by a general formula $Li_xAO_y$, where A is at least one selected from the group consisting of Nb, B, Al, Si, P, S, Ti, Zr, Mo, Ta, and W, and x and y are positive numbers.

Further, the present disclosure provides a method for manufacturing a positive electrode layer used for an all-solid-state battery, the method including: a step of producing a coating layer containing a metal sulfate on a surface of a sulfide solid electrolyte by applying a heat treatment to the sulfide solid electrolyte at a temperature of 100° C. or more and less than 190° C. for five minutes or more and an hour or less in a dry gas to obtain a coated sulfide solid electrolyte; and a step of producing the positive electrode layer by coating a slurry containing the coated sulfide solid electrolyte and a positive electrode active material and drying the slurry.

According to the present disclosure, the positive electrode layer having a low resistance can be produced using the coated sulfide solid electrolyte obtained by applying the heat treatment to the sulfide solid electrolyte in dry gas at a predetermined temperature and for a predetermined time.

Further, the present disclosure provides an all-solid-state battery including: a positive electrode layer; a negative electrode layer; and a solid electrolyte layer provided between the positive electrode layer and the negative electrode layer, and in the all-solid-state battery, the positive electrode layer is the positive electrode layer described above.

According to the present disclosure, the all-solid-state battery with a low resistance is obtained using the positive electrode layer described above.

According to the present disclosure, an effect that a positive electrode layer having a low resistance can be provided is achieved.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 1 is a schematic cross-sectional view showing an example of a coated sulfide solid electrolyte according to the present disclosure;

FIG. 2 is a flow diagram illustrating an example of a method of manufacturing a positive electrode layer according to the present disclosure;

DETAILED DESCRIPTION OF EMBODIMENTS

Figure 3:
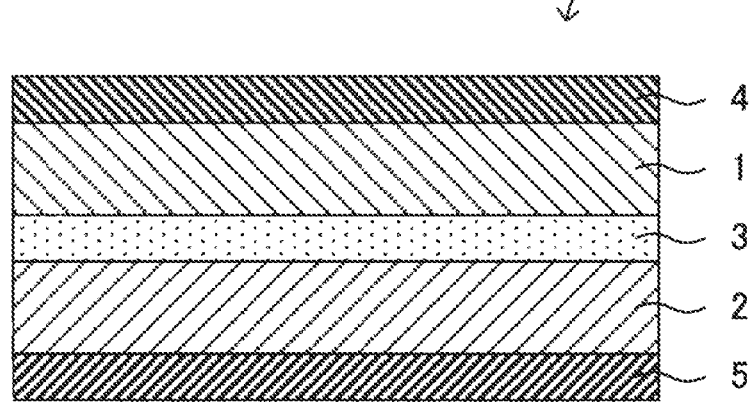
FIG. 3 is a schematic cross-sectional view showing an example of an all-solid-state battery according to the present disclosure.

Hereinafter, a positive electrode layer, a method of manufacturing a positive electrode layer, and an all-solid-state battery according to the present disclosure will be described in detail.

A. Positive Electrode Layer

Hereinafter, the positive electrode layer of the present disclosure will be described in detail. The positive electrode layer in the present disclosure includes a predetermined coated sulfide solid electrolyte and a positive electrode active material. FIG. 1 is a schematic cross-sectional view showing an example of a coated sulfide solid electrolyte according to the present disclosure. The coated sulfide solid electrolyte 11 in the present disclosure includes a sulfide solid electrolyte 11*a* and a coating layer 11*b* covering the surface of the sulfide solid electrolyte 11*a* and containing a metal sulfate. Further, in the S2p spectrum obtained by X-ray photoelectron spectroscopy (XPS) for the coated sulfide solid electrolyte 11, the ratio (P2/P1) of the intensity P2 of the peak appearing near 167 eV to the intensity P1 of the peak appearing near 163 eV is 0.15 or more and less than 0.36. In addition, the positive electrode layer in the present disclosure is used for an all-solid-state battery.

According to the present disclosure, a positive electrode layer having a low resistance is obtained by including a predetermined coated sulfide solid electrolyte.

Conventionally, a coated positive electrode active material in which coating layers containing lithium niobate (LiNbO$_3$) are formed on a positive electrode active material has been known. This coating layer has a function of suppressing the formation of a high-resistance layer generated at an interface portion between the positive electrode active material and the sulfide solid electrolyte, and reducing the interface resistance when lithium ions move at the interface between the positive electrode active material and the sulfide solid electrolyte. On the other hand, when such a coated positive electrode active material is used, the sulfur in the sulfide solid electrolyte reacts with the oxygen in the lithium niobate to form a resistance layer in some cases. For example, it is presumed that side reactions represented by the following reaction formulae occur.

$$LiNbO_3 + 0.95Li_3PS_4 \rightarrow 0.08Li_5(NbS_2)_7 + 0.75Li_3PO_4 + 0.2Nb_2PS_{10} + 0.59Li_2S$$

(Li$_3$PS$_4$ 1 mole enthalpy change ($\Delta$H)=−160.9 KJ/mol)

JP 2010-080168 A discloses a Li-containing sulfate-coated oxide-based positive electrode active material in which a Li-containing sulfate is formed on a surface of a positive electrode active material. When the Li-containing sulfate is formed on the surface of the positive electrode active material, for example, the Li-containing sulfate and the sulfide electrolyte may react to form a resistance layer as shown in the following reaction formula. For example, it is presumed that side reactions represented by the following reaction formulae occur.

$$Li_2SO_4 + 0.89Li_3PS_4 \longrightarrow 0.89Li_3PO_4 + 0.44S_8O + Li_2S$$

(Li$_3$PS$_4$ 1 mole enthalpy change ($\Delta$H)=−166.3 kJ/mol)

In contrast, the present disclosure uses a coated sulfide solid electrolyte in which the surface of the sulfide solid electrolyte is coated with a coating layer containing a metal sulfate in advance. In such a coated sulfide solid electrolyte, since the coating layer containing the metal sulfate and the sulfide solid electrolyte are chemically bonded to each other, it is presumed that the surface energy or the like is changed and side reactions between the Li-containing sulfate and the sulfide solid electrolyte are suppressed. In addition, since the surface of the sulfide solid electrolyte is covered with a coating layer containing a metal sulfate, generation of a high-resistance layer due to a reaction between the positive electrode active material and the sulfide solid electrolyte can be suppressed.

Further, even when a positive electrode active material having a coating layer including lithium niobate (LiNbO$_3$) formed thereon is used, the metal sulfate in the coating layer in the coated sulfide solid electrolyte is less likely to react with lithium niobate (no thermodynamically stable compound is present). Therefore, the formation of the high-resistance layer can be suppressed.

1. Coated Sulfide Solid Electrolyte

The coated sulfide solid electrolyte according to the present disclosure has a sulfide solid electrolyte and a coating layer covering a surface of the sulfide solid electrolyte and including a metal sulfate.

In the S2p spectrum obtained by X-ray photoelectron spectroscopy (XPS) for the coated sulfide solid electrolyte, the ratio (P2/P1) of the intensity P2 of the peak appearing near 167 eV to the intensity P1 of the peak appearing near 163 eV is not less than 0.15 and less than 0.36. P2/P1 may be 0.18 or more or 0.20 or more. On the other hand, P2/P1 may be 0.35 or less, or 0.30 or less.

The peak appearing near 163 eV is derived from P—S bonds, e.g., 159 eV to 163 eV, and peak appearing near 167 eV is derived from S—O bonds, e.g., 165 eV to 175 eV. The larger P2/P1, the smaller the proportion of P—S bonds on the surface of the coated sulfide solid electrolyte and the higher the proportion of S—O bonds, that is, the more the coating layer is formed.

If P2/P1 is too small, it is not possible to reduce the resistance to lithium-ion conduction. This is presumed to be because the formation of the coating layer is insufficient, and the sulfide solid electrolyte reacts with the positive electrode active material, and the formation of the high-resistance layer cannot be suppressed. In addition, even if P2/P1 is too large, the cell resistivity cannot be reduced. This is presumed to be because the coating layer is excessively formed and the lithium ion path is limited.

(1) Coating Layer

The coating layer in the present disclosure is formed on the surface of the sulfide solid electrolyte and includes a metal sulfate. Examples of the metal contained in the metal sulfate include alkali metals such as Li and Na. As the metal sulfate, a metal sulfate containing Li is preferable, and among them, Li$_2$SO$_4$ is preferable. This is because the Li conductivity is high. In addition, since Li$_2$SO$_4$ is a sulfate having only Li as a metal element, the other metal element does not react with the positive electrode active material or the sulfide solid electrolyte. Therefore, the formation of the resistance layer by such a reaction is suppressed, and the resistance to lithium ion conduction is reduced.

The film thickness of the coating layer in the present disclosure is not particularly limited, but may be, for example, 1 nm or more and 5 nm or more. On the other hand, the thickness may be 20 nm or less and 15 nm or less. This is because the resistance to lithium ion conduction can be made smaller by making the film thickness of the coating layer thinner. The thickness of the coating layer can be analyzed by adopting a technique such as fluorescence X-ray analysis (XRF).

The coating layer according to the present disclosure covers at least a part of the surface of the sulfide solid electrolyte. The coating layer may be formed on a part of the surface of the sulfide solid electrolyte, or may be formed on the entire surface. The coverage of the coating layer is, for example, 50% or more, may be 70% or more, or may be 90% or more.

In the coated sulfide solid electrolyte according to the present disclosure, it is presumed that the formation of the coating layer proceeds as the amount of oxygen on the surface increases. The oxygen content (%) on the surface of the coated sulfide solid electrolyte is calculated by the following formula using the element concentration of each element obtained by XPS.

$$\text{Oxygen content (\%)} = (\text{O element concentration/element concentration other than O element}) \times 100.$$

The oxygen content (%) on the surface of the coated sulfide fixed electrolyte is, for example, 5% or more, may be 20% or more, or may be 40% or more.

For example, in the case of a coated sulfide solid electrolyte containing Li, P, S, Br and I, the percentage (%) of oxygen on the surface of the coated sulfide solid electrolyte is calculated by the following formula using the element concentration of each element (O, S, P, Li, Br and I) obtained by XPS.

$$\text{Oxygen content (\%)} =$$

$$\{\text{O element concentration/(S + P + Li + Br + I) element concentration}\} \times 100.$$

(2) Sulfide Solid Electrolyte

The sulfide solid electrolyte in the present disclosure usually contains sulfur (S) as a main component of an anionic element. The sulfide solid electrolyte in the present disclosure preferably contains Li, P, and S. The sulfide solid electrolyte in the present disclosure may contain only Li, P, and S, or may contain other elements. Examples of other elements include X (X is a halogen element). Examples of X include F, Cl, Br, and I. X may be one kind or two or more kinds. Among them, the sulfide solid electrolyte preferably further contains at least one of Br and I.

The sulfide solid electrolyte in the present disclosure preferably includes an ion conductor containing Li, P, and S. The ionic conductor preferably has an ortho-compositional anion structure $(PS_4{}^{3-})$ as a main component of the anion. This is because the chemical stability is high. The proportion of the anionic structure of the ortho composition is, for example, 70 mol % or more, may be 80 mol % or more, or may be 90 mol % or more with respect to the total anionic structure in the ion conductor. The proportion of the anionic structure of the ortho composition can be determined, for example, by Raman spectroscopy, NMR, XPS.

The sulfide solid electrolyte may contain lithium halide in addition to the ion conductor. Examples of the lithium halide include LiF, LiCl, LiBr, and LiI, and among them, LiCl, LiBr and LiI are preferable. The proportion of LiX (X=F, I, Cl, Br) in the sulfide solid electrolyte is, for example, 5 mol % or more, and may be 15 mol % or more. On the other hand, the proportion of LiX is, for example, 30 mol % or less, and may be 25 mol % or less.

The sulfide solid electrolyte may have a composition represented by $xLiI \cdot yLiBr \cdot z$ $(\alpha Li2S \cdot (1-\alpha)P_2S_5)$. Here, x+y+z=100, $0 \leq x < 100$, $0 \leq y < 100$, $0 < z \leq 100$, $0.70 \leq \alpha \leq 0.80$. x may be greater than 0. In this case, x may be 5 or more and may be 10 or more. Also, x may be 50 or less, or 30 or less. Also, y may be greater than 0. In this case, y may be 5 or more and may be 10 or more. Further, y may be 50 or less, or 30 or less. z may be 50 or more and may be 60 or more. $\alpha$ may be 0.72 or more and may be 0.74 or more. On the other hand, $\alpha$ may be 0.78 or less, or 0.76 or less.

The sulfide solid electrolyte may be a glass-based sulfide solid electrolyte, a glass-ceramic-based sulfide solid electrolyte, or a crystal-based sulfide solid electrolyte.

Examples of the shape of the sulfide solid electrolyte include particulate. The average particle diameter (D50) of the sulfide solid electrolyte is, for example, 0.1 μm or more, and may be 1 μm or more. Meanwhile, the average particle diameter (D50) of the sulfide solid electrolyte is, for example, 50 μm or less, and may be 30 μm or less. The average particle size (D50) can be determined, for example, by observation with a scanning electron microscope (SEM). The number of samples is preferably large, for example 100 or more. The sulfide solid electrolyte preferably has a high ionic conductivity. The ionic conductivity at 25° C. is, for example, $1 \times 10^{-5}$ S/cm or more, may be $1 \times 10^{-4}$ S/cm or more, and may be $1 \times 10^{-3}$ S/cm or more.

(3) Coated Sulfide Solid Electrolyte

The proportion of the coated sulfide solid electrolyte in the positive electrode layer is, for example, 5% by weight or more and 75% by weight or less, and may be 10% by weight or more and 60% by weight or less. If the proportion of the coated sulfide solid electrolyte is small, there is a possibility that the ion conduction path is not sufficiently formed. On the other hand, if the proportion of the coated sulfide solid electrolyte is large, the volume energy density may be low.

The positive electrode layer in the present disclosure may contain only a coated sulfide solid electrolyte as a solid electrolyte, or may contain other solid electrolytes. The total ratio of the coated sulfide solid electrolyte to all the solid electrolytes contained in the positive electrode layer is, for example, 50% by weight or more, may be 70% by weight or more, or may be 90% by weight or more.

The method for producing the coated sulfide solid electrolyte is not particularly limited as long as the coated sulfide solid electrolyte described above can be obtained, and examples thereof include the method described in "B. Method for Producing a Positive Electrode Layer 1. Process for Producing a Coated Sulfide Solid Electrolyte" described later.

The coated sulfide solid electrolyte in the present disclosure can also be produced by performing an oxygen plasma treatment on the sulfide solid electrolyte. In this process, P2/P1 of the S2p spectrum obtained by XPS for the coated sulfide solid electrolyte is adjusted so as to be within a predetermined range.

2. Positive Electrode Active Material

The positive electrode layer in the present disclosure includes a positive electrode active material. An example of the positive electrode active material in the present disclosure is an oxide active material. The oxide active material is particularly likely to form a high-resistance layer between the oxide active material and the sulfide solid electrolyte. As the oxide active material, for example, rock salt bed-type active material such as $LiCoO_2$, $LiMnO_2$, $LiNiO_2$, $LiVO_2$, $LiNi_{1/3}CO_{1/3}Mn_{1/3}O_2$, Spinel-type active material such as $LiMn_2O_4$, $Li_4Ti_5O_{12}$, $Li(Ni_{0.5}Mn_{1.5})O_4$, Olivine type active material such as $LiFePO_4$, $LiMnPO_4$, $LiNiPO_4$, $LiCoPO_4$, Ramsdellite-type active material such as $Li_2Ti_3O_7$, and solid solution-type active material containing $Li_2MnO_3$ can be exemplified.

Further, the oxide active material may be represented by, for example, the following formulae: $Li_xM_yO_z$ (M is a metallic element other than Li, x=0.02 to 2.2, y=1 to 2, z=1.4 to 4). In the above general formula, M is preferably at least one selected from the group consisting of Co, Al, Mn, Ni, V, Fe, and Si, and more preferably at least one selected from the group consisting of Co, Ni, Al, and Mn.

Among them, the oxide active material is preferably lithium nickel cobalt aluminum oxide (NCA), lithium nickel cobalt manganate (NCM), or lithium nickelate.

A coating layer containing an ion-conductive oxide is preferably formed on the surface of the positive electrode active material in the present disclosure. Examples of the Li-ion conductive oxide include, but are not limited to, Li-ion conductive oxides represented by the formulae $Li_xAO_y$, (A is at least one selected from the group consisting of Nb, B, Al, Si, P, S, Ti, Zr, Mo, Ta, W, and x and y are positive numbers). In detail, $LiNbO_3$, $Li_3BO_3$, $LiBO_2$, $LiAlO_2$, $Li_4SiO_4$, $Li_2SiO_3$, $Li_3PO_4$, $Li_2SO_4$, $LI_2TiO_3$, $Li_4Ti_5O_{12}$, $Li_2Ti_2O_5$, $Li_2ZrO_3$, $Li_2MoO_4$, $Li_2WO_4$, and the like can be cited. The Li-ion conductive oxide may be a composite compound of Li-ion conductive oxide. Among them, $LiNbO_3$ is preferable.

The thickness of the coating layer is, for example, preferably in the range of 0.1 nm to 100 nm, and more preferably in the range of 1 nm to 20 nm. If the coating layer is too thick, Li-ion conductivity and electron conductivity may be reduced. Examples of the method for measuring the thickness of the coating layer include fluorescence X-ray analysis (XRF) and transmission electron microscope (TEM).

The coating ratio of the coating layer on the surface of the positive electrode active material is preferably high, specifically preferably 50% or more, and more preferably 80% or more. The coating layer may cover the entire surface of the positive electrode active material. Examples of the method for measuring the coverage of the coating layer include X-ray photoelectron spectroscopy (XPS). For example, when a coating layer containing lithium niobate ($LiNbO_3$) is formed on the surface of lithium nickel cobalt manganate (NCM), which is a positive electrode active material, the molar number of Ni, Co, Mn, and Nb on the surface of the positive electrode active material can be measured by XPS, and can be calculated from the molar fraction of Nb with respect to the total molar number of Ni, Co, Mn, and Nb.

The proportion of the positive electrode active material in the positive electrode layer is, for example, 20% by weight or more, may be 30% by weight or more, or may be 40% by weight or more. On the other hand, the proportion of the positive electrode active material is, for example, 90% by weight or less, may be 85% by weight or less, or may be 80% by weight or less.

3. Positive Electrode Layer

The positive electrode layer in the present disclosure contains the above-described coated sulfide solid electrolyte and positive electrode active material. If necessary, at least one of the conductive material and the binder may be further contained.

Examples of the conductive material include carbon materials, metal particles, and conductive polymers. Examples of the carbon material include particulate carbon materials such as acetylene black (AB) and Ketjen black (KB), and fibrous carbon materials such as carbon fibers, carbon nanotubes (CNTs), and carbon nanofibers (CNFs).

The proportion of the conductive material in the positive electrode layer is, for example, 0.1 wt % or more and 10 wt % or less, and may be 0.3 wt % or more and 10 wt % or less.

Examples of the binder include a rubber binder and a fluoride binder. The content of the binder in the positive electrode layer is, for example, 0.1 wt % or more and 30 wt % or less, and may be 0.1 wt % or more and 15 wt % or less.

The thickness of the positive electrode layer is, for example, 0.1 μm or more and 1000 μm or less.

B. Method for Manufacturing Positive Electrode Layer

FIG. 2 is a flowchart illustrating an example of a method for manufacturing a positive electrode layer according to the present disclosure. In the manufacturing method shown in FIG. 2, first, a sulfide solid electrolyte is subjected to a heat treatment at a temperature of 100° C. or more and less than 190° C. for 5 minutes or more and 1 hour or less in a dry gas to form a coating layer containing a metal sulfate on the surface of the sulfide solid electrolyte, thereby obtaining a coated sulfide solid electrolyte (coated sulfide solid electrolyte manufacturing step). Next, a slurry containing the coated sulfide solid electrolyte and the positive electrode active material is coated and dried to form a positive electrode layer (positive electrode layer forming step).

According to the present disclosure, a positive electrode layer for an all-solid-state battery having low resistance can be manufactured. Hereinafter, a method for manufacturing a positive electrode layer according to the present disclosure will be described for each step.

1. Coated Sulfide Solid Electrolyte Preparation Process

The sulfide solid electrolyte used in this step is the same as the sulfide solid electrolyte described in "A. Positive electrode layer 1. Coated sulfide solid electrolyte (2) Sulfide solid electrolyte" described above, and therefore description thereof will be omitted.

The dry gas is a low dew point gas having a dew point temperature of 0° C. or lower. The dew point temperature may be, for example, −50° C. or lower, or −60° C. or lower. The oxygen concentration in the dry gas is, for example, 20% by volume or less. The dry gas is, for example, dry air.

As the heat treatment in the dry gas, for example, a method of heat treatment using a hot plate or the like in a dry gas glove box can be adopted.

The heat treatment temperature in the dry gas is usually 100° C. or higher, may be 120° C. or higher, or may be 130° C. or higher. If the heat treatment temperature is too low, the coating layer is not sufficiently formed, and the formation of the high-resistance layer cannot be suppressed. On the other hand, it is usually less than 190° C., may be 180° C. or less, may be 170° C. or less. If the heat treatment temperature is too high, the coating layer may be excessively formed, and the lithium ion path may be limited.

The heat treatment time in the dry gas is usually 5 minutes or more and 1 hour or less.

Further, the coated sulfide solid electrolyte produced by this step is the same as the content described in "A. Positive electrode layer 1. Coated sulfide solid electrolyte" above, and therefore the description thereof will be omitted.

According to this step, a coated sulfide solid electrolyte in which the coating layer contains lithium sulfate is usually produced.

2. Positive Electrode Layer Forming Step

This step is a step of forming a positive electrode layer by coating a slurry containing a coated sulfide solid electrolyte and a positive electrode active material and drying the slurry. The slurry may further contain a binder, a conductive material, and a solvent, if necessary. The solvent is a broad meaning including a dispersion medium.

The slurry is preferably coated on a current collector. The coating method of the slurry is not particularly limited, and any known coating method can be employed. Further, the positive electrode layer produced by each of the above-described steps is the same as the content described in "A. positive electrode layer" above, and therefore the description thereof will be omitted.

C. All Solid State Battery

FIG. 3 is a schematic cross-sectional view illustrating an all-solid-state battery according to the present disclosure. The all-solid-state battery 10 illustrated in FIG. 3 includes a positive electrode layer 1, a negative electrode layer 2, a solid electrolyte layer 3 disposed between the positive electrode layer 1 and the negative electrode layer 2, a positive electrode current collector 4 that collects current in the positive electrode layer 1, and a negative electrode current collector 5 that collects current in the negative electrode layer 2. In the present disclosure, the positive electrode layer 1 is the positive electrode layer described in "A. positive electrode layer" above.

According to the present disclosure, by using the above-described positive electrode layer, an all-solid-state battery with low resistance is obtained.

1. Positive Electrode Layer

The positive electrode layer in the present disclosure is the same as the content described in "A. positive electrode layer" above, and therefore the description thereof will be omitted.

2. Negative Electrode Layer

The negative electrode layer in the present disclosure is a layer containing at least a negative electrode active material. The negative electrode active material layer may contain at least one of a solid electrolyte, a conductive material, and a binder, if necessary.

The negative electrode active material is not particularly limited, and examples thereof include a metal active material, a carbon active material, and an oxide active material. Examples of the metal active material include a single metal and a metal alloy. Examples of the metal element contained in the metal active material include Si, Sn, In, and Al. The metal alloy is preferably an alloy containing the metal element as a main component.

Examples of the carbon active material include mesocarbon microbeads (MCMB), highly oriented graphite (HOPG), hard carbon, and soft carbon. Examples of the oxide active material include lithium titanate such as $Li_4Ti_5O_{12}$.

The proportion of the negative electrode active material in the negative electrode layer is, for example, 20% by weight or more, may be 30% by weight or more, or may be 40% by weight or more. On the other hand, the proportion of the negative electrode active material is, for example, 80% by weight or less, may be 70% by weight or less, or may be 60% by weight or less.

The solid electrolyte is the same as the content described in "3. Solid electrolyte layer" described later, and therefore the description thereof will be omitted.

The conductive material and the binder are the same as those described in "A. Positive Electrode Layer" above, and therefore the description thereof will be omitted. The thickness of the negative electrode layer is, for example, 0.1 μm or more and 1000 μm or less.

3. Solid Electrolyte Layer

The solid electrolyte layer according to the present disclosure is disposed between the positive electrode layer and the negative electrode layer. The solid electrolyte layer contains at least a solid electrolyte, and may further contain a binder.

The solid electrolyte may be a conventionally known solid electrolyte commonly used in all-solid-state lithium-ion batteries, and examples thereof include a sulfide solid electrolyte, an oxide solid electrolyte, a nitride solid electrolyte, and a halide, and among them, a sulfide solid electrolyte is preferable. The sulfide solid electrolyte is the same as the content described in "A. Positive Electrode Layer" above, and therefore the description thereof will be omitted.

The binder is the same as the content described in "A. Positive electrode layer", and therefore the description thereof will be omitted. The thickness of the solid electrolyte layer is, for example, 0.1 μm or more and 1000 μm or less.

4. All Solid State Battery

In the present disclosure, an "all-solid-state battery" refers to a battery including a solid electrolyte layer (a layer containing at least a solid electrolyte). In addition, the all-solid-state battery according to the present disclosure may include at least one power generation element including a positive electrode layer, a solid electrolyte layer, and a negative electrode layer, and may include two or more elements. When the all-solid-state battery has a plurality of power generation elements, they may be connected in parallel or may be connected in series. The power generation element typically includes a positive electrode current collector and a negative electrode current collector. The positive electrode current collector is disposed, for example, on a surface of the positive electrode layer opposite to the solid electrolyte layer. Examples of the material of the positive electrode current collector include metals such as aluminum, SUS, and nickel. Examples of the shape of the positive electrode current collector include a foil shape and a mesh shape. A carbon coat layer may be formed on a surface of the positive electrode current collector on the positive electrode layer side. On the other hand, the negative electrode current collector is disposed, for example, on a surface of the negative electrode layer opposite to the solid electrolyte layer. Examples of the material of the negative electrode current collector include metals such as copper, SUS, and nickel. Examples of the shape of the negative electrode current collector include a foil shape and a mesh shape.

The all-solid-state battery according to the present disclosure may include an exterior body that houses the power generation element. Examples of the exterior body include a laminate-type exterior body and a case-type exterior body. In addition, the all-solid-state battery according to the present disclosure may include a restraining jig that applies a restraining pressure in a thickness direction to the power generation element. As the restraining jig, a known jig can be used. The constraining pressure may be, for example, greater than or equal to 0.1 MPa and less than or equal to 50 MPa, and greater than or equal to 1 MPa and less than or equal to 20 MPa. If the constraining pressure is small, a good ion conduction path and a good electron conduction path may not be formed. On the other hand, if the constraining pressure is large, the constraining jig may be large, and the volume energy density may be lowered.

The type of the all-solid-state battery in the present disclosure is not particularly limited, but is typically a lithium-ion secondary battery. Applications of the all-solid-state batteries are not particularly limited, and examples thereof include power supplies of vehicles such as hybrid electric vehicles (HEVs), plug-in hybrid electric vehicles (PHEV), battery electric vehicles (BEVs), gasoline vehicles, and diesel vehicles. In particular, it is preferably used as a power source for driving a hybrid electric vehicle, a plug-in hybrid electric vehicle, or a battery electric vehicle. In addition, the all-solid-state battery in the present disclosure may be used as a power source for a moving object (for example, a railway, a ship, or an aircraft) other than a vehicle, or may be used as a power source for an electric product such as an information processing apparatus.

Note that the present disclosure is not limited to the above-described embodiment. The above-described embodiment is an example, and any one having substantially the same configuration as the technical idea described in the claims in the present disclosure and having the same operation and effect is included in the technical scope of the present disclosure.

Example 1

(Preparation of Negative Electrode Structure)

A negative electrode active material (Si particles, average particle diameter: 0.5 μm), a sulfide solid electrolyte (10LiI·15LiBr·75 (0.75Li$_2$S·0.25P$_2$S$_5$) (mol %), an average particle diameter: 0.5 μm), a conductive material (VGCF-H), and binders (SBRs) were prepared. These were weighed so as to have a weight ratio of negative electrode active material: sulfide solid electrolyte: conductive material: binder=47.0:44.6:7.0:1.4, and mixed with a dispersion medium (diisobutyl ketone). The resulting mixture was dispersed by an ultrasonic homogenizer (UH50, manufactured by S.M. Co., Ltd.) to obtain a negative electrode slurry. The obtained negative electrode slurry was coated on a negative electrode current collector (Ni foil, thickness: 22 μm) by a blade coating method using an applicator, and dried at 100° C. for 30 minutes. Thereafter, the surface opposite to the negative electrode current collector was similarly coated to obtain a double-sided negative electrode structure having a negative electrode layer and a negative electrode current collector. The negative electrode layer had a single-sided thickness of 60 μm.

(Preparation of Coated Sulfide Solid Electrolyte)

To 2 g of the sulfide solid-electrolyte (10LiI·15LiBr·75 (0.75Li$_2$S·0.25P$_2$S$_5$) (mol %)) (mean particle size 0.5 μm), dew point −70° C., in dry air oxygen-volume concentration 20% atmosphere, using a hot plate, 100° C., was heat-treated for 5 minutes. Thus, a coating layer containing lithium sulfate was formed on the surface of the sulfide solid electrolyte, and a coated sulfide solid electrolyte was obtained.

(Preparation of Positive Electrode Member)

LiNbO$_3$ coated positive electrode active material (LiNi$_{0.8}$Co$_{0.15}$Al$_{0.05}$O$_2$, average grain size 10 μm), the above-obtained coated sulfide solid electrolyte, a plastic material (VGCF-H), and a binder (SBR) were prepared. These were weighed so that the weight ratio was as follows: positive electrode active material: coated sulfide solid electrolyte: conductive material: binder =83.3:14.4:2.1:0.2, and mixed with a dispersion medium (diisobutyl ketone). The resulting mixture was dispersed by an ultrasonic homogenizer (UH-50, manufactured by S.M.T.) to obtain a positive electrode slurry. The obtained positive electrode slurry was coated on an Al foil (thickness: 15 μm) by a blade coating method using an applicator, and dried at 100° C. for 30 minutes. Thus, a positive electrode member having a positive electrode layer and an Al foil was obtained. The thickness of the positive electrode layer was 100 μm.

(Preparation of Member for Solid Electrolyte Layer)

Sulfide solid electrolyte (10LiI·15LiBr·75 (0.75Li$_2$S·0.25P$_2$S$_5$) (mol %), mean particle size 2.0 μm) and binder (SBR) were weighed in weight-ratio so that sulfide solid electrolyte: binder =99.6:0.4. These were mixed with a dispersion medium (diisobutyl ketone). The mixture was dispersed by an ultrasonic homogenizer (UH-50, manufactured by S.M. Co., Ltd.) to obtain a slurry for a solid-state electrolyte layer. The obtained slurry for solid electrolyte layer was coated on an Al foil (thickness: 15 μm) by a blade coating method using an applicator, and dried at 100° C. for 30 minutes. Thus, a solid electrolyte layer member having an Al foil and a solid electrolyte layer was obtained. The thickness of the solid electrolyte layer was 30 μm.

(Preparation of All Solid State Battery)

The negative electrode structure and the solid electrolyte layer member were cut out to a size of 7.2 cm×7.2 cm. On the other hand, the positive electrode member was cut into a size of 7.0 cm×7.0 cm.

The solid electrolyte layer of the solid electrolyte layer member was brought into contact with the negative electrode layer located on one surface side of the negative electrode structure, and the solid electrolyte layer of the solid electrolyte layer member was also brought into contact with the negative electrode layer located on the other surface side of the negative electrode structure. The resulting laminate was pressed at a linear pressure of 1.6 t/cm by a roll pressing method. Next, the Al foil was peeled from each of the solid electrolyte layers to expose the solid electrolyte layer. Thereafter, the positive electrode layer of the positive electrode member was bonded to each of the exposed solid electrolyte layers so as to be in direct contact with each other. The resulting laminate was pressed at a linear pressure of 1.6 t/cm by a roll pressing method. Next, the Al foil was peeled from the respective positive electrode active material layers, the positive electrode active material layers were exposed, and the layers were further pressed at a linear pressure of 5 t/cm by a roll pressing method. Next, a positive electrode current collector (Al foil, thickness: 15 μm) was disposed in each of the positive electrode active material layers subjected to roll pressing. Next, a tab for current collection was placed on the positive electrode current collector and the negative electrode current collector, respectively, and laminated and sealed to obtain an all-solid-state battery.

Example 2-Example 4 and Comparative Example 4

To 2 g of sulfide solid electrolyte (10LiI·15LiBr·75 (0.75Li$_2$S·0.25P$_2$S$_5$) (mol %)) (mean particle size 0.5 μm), in a dry air having a dew point of −70° C. and an oxygen volume concentration of 20%, was heated using a hot plate at the temperatures and times shown in Table 1. Thus, a coated sulfide solid electrolyte was obtained. An all-solid-state battery was prepared in the same manner as in Example 1, except that the obtained coated sulfide solid electrolyte was used.

Comparative Example 1 and Comparative Example 3

For sulfide solid electrolyte (10LiI·15LiBr·75 (0.75Li$_2$S·0.25P$_2$S$_5$) (mol %)), the average particle size 0.5

µm), the time shown in Table 1 in dry air, by placing at room temperature, to obtain a coated sulfide solid electrolyte.

An all-solid-state battery was prepared in the same manner as in Example 1, except that the obtained coated sulfide solid electrolyte was used.

Comparative Example 2

An all-solid-state battery was prepared in the same manner as in Example 1, except that the sulfide solid electrolyte (10LiI·15LiBr·75 (0.75Li$_2$S·0.25P$_2$S$_5$) (mol %), average particle diameter 0.5 µm) was used without heat treatment in dry air.

(XPS Measurement)

Figure 4:
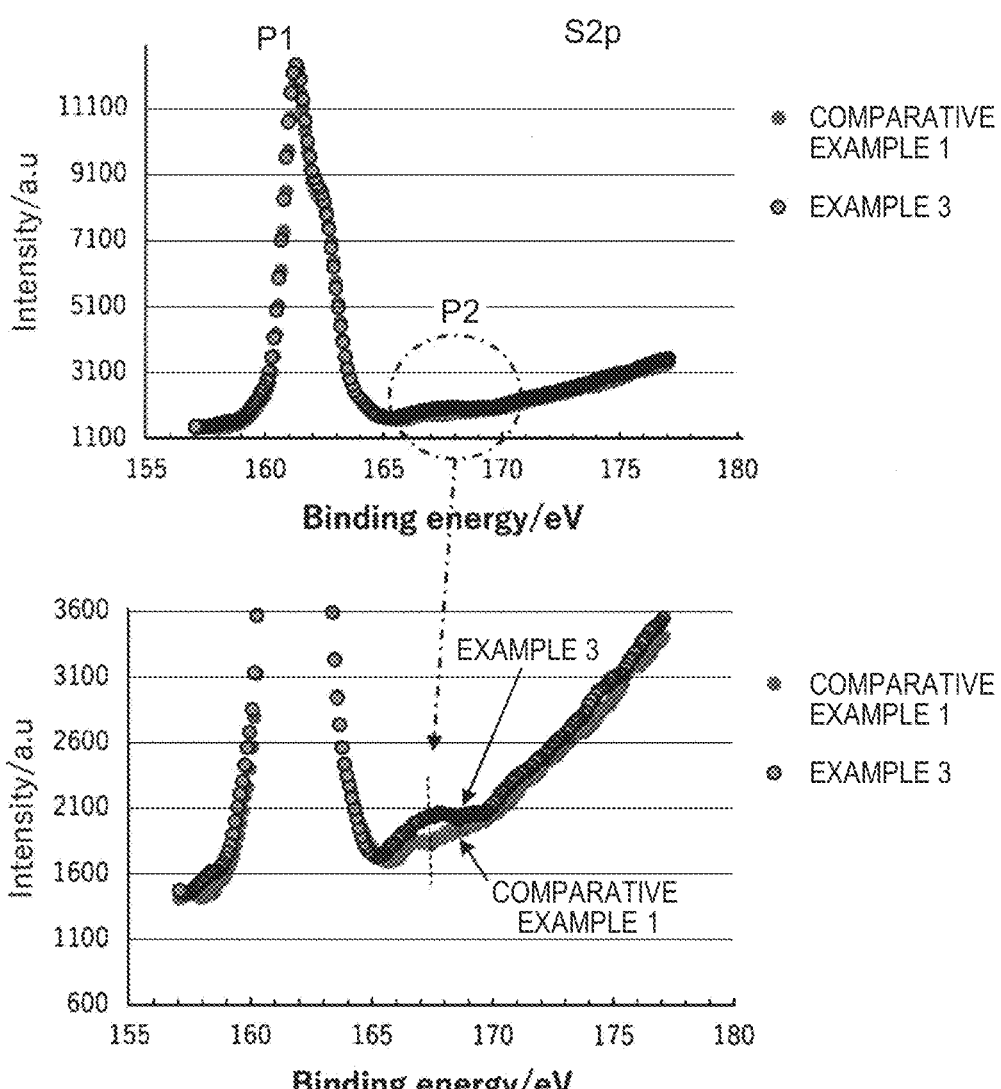
FIG. 4 is an S2p spectrum obtained by XPS measurement of the coated sulfide solid electrolyte prepared in Example 3 and Comparative Example 1.

X-ray photoelectron spectroscopy (XPS) was performed on the coated sulfide solid electrolytes prepared in Examples 1 to 4 and Comparative Examples 1 to 4. Table 1 shows the ratio (P2/P1) of the intensity P2 of the peak appearing near 167 eV to the intensity P1 of the peak appearing near 163 eV of the S2p spectrum. Note that a peak appearing near 163 eV is derived from the P—S bond, and a peak appearing near 167 eV is derived from the S—O bond. FIG. 4 shows S2p spectra obtained by XPS measurement on the coated sulfide solid electrolyte prepared in Example 3 and Comparative Example 1.

The oxygen content (%) on the surfaces of the coated sulfide solid electrolytes prepared in Examples 1 to 4 and Comparative Examples 1 to 4 was calculated by the following formula using the element concentrations of the elements (O, S, P, Li, Br, and I) obtained by XPS. Table 1 shows the relative values of the oxygen amounts of Examples 1 to seconds elapsed time was calculated. The results are shown in the column "Initial 0.1 s Resistance" in Table 1. Furthermore, the resistance from 0.1 seconds elapsed time to 10 seconds elapsed time was calculated by the voltage drop amount from 0.1 seconds elapsed time to 10 seconds elapsed time. The results are shown in the column "Initial 10 s Resistance" in Table 1. Note that the "initial 0.1 s resistance" is considered to be correlated with the interfacial resistance between the positive electrode active material and the sulfide solid electrolyte. The "initial 10 s resistance" is considered to be correlated with the ion conduction resistance in the positive electrode layer.

(Reaction Resistance Evaluation at High Cycle)

The all-solid-state batteries obtained in Examples 1 to 4 and Comparative Examples 1 to 4 were sized at a 5 MPa constraint pressure and charged at 0.461 mA for constant current-constant voltage (CC-CV) to 4.35V. Then, CC-CV was discharged to 3.0V at 0.461 mA. Thereafter, the all-solid-state battery was charged again. Charging at this time was set as the first charging. Cycles were evaluated at 2 C up to 100 cycles.

The internal resistance evaluation by the impedance method was carried out. Specifically, after the initial charging and discharging, the ratio was adjusted to SOC40%, and the circular hole components of the impedance were obtained. Similarly, the internal resistance evaluation after 100 cycles was performed. The resistance increase rate (times) was calculated by the following formula. The results are shown in Table 1.

TABLE 1

Resistance increase rate (times) = 100 cycles after internal resistance/1 cycle after internal resistance

| | Gas | Temperature [° C.] | Time [min] | Peak ratio of 167 eV/ 163 eV | Oxygen content on the electrolyte surface | Initial 0.1 s resistance [Ω] | Initial 10 s resistance [Ω] | Resistance increase ratio |
|---|---|---|---|---|---|---|---|---|
| Example 1 | Dry air | 100 | 5 | 0.15 | 1.07 | 9.5 | 25.8 | 1.15 |
| Example 2 | Dry air | 150 | 5 | 0.15 | 1.09 | 9.5 | 25.8 | 1.2 |
| Example 3 | Dry air | 170 | 5 | 0.24 | 1.26 | 8.1 | 23.7 | 1.18 |
| Example 4 | Dry air | 170 | 60 | 0.29 | 1.38 | 8.9 | 24.2 | 1.34 |
| Comparative Example 1 | Dry air | Room temperature | 5 | 0.03 | 1 | 10.8 | 29.5 | 1.3 |
| Comparative Example 2 | | — | | 0.01 | 1.01 | 10.7 | 28.1 | 1.26 |
| Comparative Example 3 | Dry air | Room temperature | 60 | 0.07 | 1.02 | 12.7 | 31.8 | 1.33 |
| Comparative Example 4 | Dry air | 190 | 5 | 0.36 | 1.46 | 13.2 | 51.6 | 1.38 |

4 and Comparative Examples 2 to 4 when the oxygen amount of Comparative Example 1 is 1.

Oxygen content (%)=O/(S+P+Li+Br+I)

Charge/Discharge Test

The all-solid-state batteries obtained in Examples 1 to 4 and Comparative Examples 1 to 4 were fixed in size at a 5 MPa constraint pressure and charged at a constant current-constant voltage (CC-CV) up to 4.05 V at 0.0194 A. Then, CC-CV was discharged to 3.0V at 0.0194 A. Thereafter, the all-solid-state battery was charged again. Charging at this time was set as the first charging. From the voltage drop amount at 0.1 seconds after the start of the first discharge, the resistance from the discharge start time (0 seconds) to 0.1

From the results shown in Table 1. it was confirmed that the all-solid-state batteries of Examples 1 to 4 had low resistance with respect to the all-solid-state batteries of Comparative Examples 1 to 4.

What is claimed is:

1. A positive electrode layer for an all-solid-state battery, the positive electrode layer comprising:

a positive electrode active material; and a coated sulfide solid electrolyte that includes (i) a sulfide solid electrolyte and (ii) a coating layer that coats a surface of the sulfide solid electrolyte and contains a metal sulfate, wherein:

in the positive electrode layer, a ratio of an intensity P2 of a peak appearing near 167 eV to an intensity P1 of a peak appearing near 163 eV (P2/P1) is 0.15 or more and less than 0.36 in an S2p spectrum obtained by X-ray photoelectron spectroscopy (XPS) with respect to the coated sulfide solid electrolyte;

the coating layer covers 50% or more of the surface of the sulfide solid electrolyte;

the sulfide solid electrolyte contains Li, P, and S;

the peak appearing near 163 eV is derived from a P—S bond;

the peak appearing near 167 eV is derived from an S—O bond; and the coating layer has a thickness of 1 nm or more and 15 nm or less.

2. The positive electrode layer according to claim 1, wherein the metal sulfate is a lithium sulfate.

3. The positive electrode layer according to claim 1, wherein a surface of the positive electrode active material is coated with a Li ion conductive oxide represented by a general formula $Li_xAO_y$, where A is at least one selected from the group consisting of Nb, B, Al, Si, P, S, Ti, Zr, Mo, Ta, and W, and x and y are positive numbers.

4. An all-solid-state battery comprising:

the positive electrode layer according to claim 1;

a negative electrode layer; and a solid electrolyte layer provided between the positive electrode layer and the negative electrode layer.

5. The positive electrode layer according to claim 1, wherein a thickness of the positive electrode layer is 0.1 μm or more and 1000 μm or less.

6. The positive electrode layer according to claim 1, wherein the sulfide solid electrolyte consists essentially of Li, P, and S.

7. The positive electrode layer according to claim 1, wherein the sulfide solid electrolyte contains Br.

8. The positive electrode layer according to claim 1, wherein the sulfide solid electrolyte contains I.

\* \* \* \* \*